United States Patent [19]

Ross

[11] Patent Number: 4,587,943
[45] Date of Patent: May 13, 1986

[54] FISHING SLINGSHOT FIXTURE

[76] Inventor: Alex J. Ross, R.D. #1, Butlerville, Ind. 47223

[21] Appl. No.: 723,017

[22] Filed: Apr. 15, 1985

[51] Int. Cl.[4] .............................................. F41B 7/00
[52] U.S. Cl. ................................... 124/20 R; 124/80; 43/19; 43/22
[58] Field of Search ............................ 43/19, 22, 23; 124/20 R, 20 A, 20 B, 80

[56] References Cited

U.S. PATENT DOCUMENTS 3,010,242  11/1961  Emanuel ............................ 43/22 X
3,129,525   4/1964  Lewis ................................. 43/19
3,683,882   8/1972  Braxton ............................. 43/19 X
3,949,730   4/1976  Schoenberger .................... 43/19 X Primary Examiner—Nicholas P. Godici
Assistant Examiner—Carmine Cuda
Attorney, Agent, or Firm—John H. Calhoun, Jr.

[57] ABSTRACT

A fishing slingshot fixture adapted to receive a fishing reel and a slingshot detachably coupled thereto comprising a base plate having a forward extending guide arm with a vertically adjustable fishing line guide-eye mounted thereon. Clamping means are provided for quickly and easily clamping a fishing reel to the top of the base plate and for clamping a slingshot behind the base plate. A fisherman may propel a baited hook or fishing lure into a desired location using the slingshot. The guide eye allows a fishing line to be unreeled from and be reeled onto the reel without becoming tangled.

2 Claims, 2 Drawing Figures

U.S. Patent  May 13, 1986  4,587,943

FISHING SLINGSHOT FIXTURE

BACKGROUND OF THE INVENTION

This invention relates to fishing slingshot devices and more particularly to a new and novel fixture for fishing slingshots.

Success in fishing frequently depends upon a fisherman's ability to accurately place a baited hook, fishing lure or fly in a spot where fish are likely to be. A common means for placing a fishing line is to swing a fishing rod to which a reel is attached. At just the right instant in the swing the fisherman releases the drag on the reel allowing the line to be cast in the general direction where fish are believed to be. Casting in this manner involves swinging a rod through a wide arc with one or more hooks, weights, floats, baits or other devices attached to the remote end. Swinging of a fishing rod may be dangerous to persons in close proximity to the free end of the rod. In crowded areas the rod may strike objects such as overhanging branches. The line must be released by the fisherman at just the right instant, otherwise it will not be accurately placed. A fisherman must consider the arc through which the rod is being swung, the velocity of the swing, the weight of devices at the end of the line, the residual drag of the reel, the direction and distance to the desired point of placement, the presence and location of any intervening obstructions, etc. during a swing that lasts only a fraction of a second. Even experienced fishermen frequently miss their mark by substantial distances, and inexperienced or un-skilled fishermen have even less chance of being successful. Further, the distance that a fisherman can cast his line is limited.

In order to overcome these limitations, fishermen have adopted various devices for casting fishing lines greater distances and with greater accuracy and safety. Examples of such devices include fishing slingshots, bow and arrow devices for propelling a baited hook or lure, and similar schemes. The present invention is most closely related to fishing slingshot devices.

Fishing slingshots are well known in the prior art as shown by U.S. Pat. No. 2,823,483 issued on Feb. 18, 1958 to J. O. Mallott, which shows a fishing pole with a slingshot attached to the front end. U.S. Pat. No. 3,129,525 issued on Apr. 21, 1964 to R. K. Lewis shows a bow casting device in which a fishing line is hooked onto the end of an arrow that is shot from a bow mounted at the top of a pistol grip handle mounted above a modified fishing rod. U.S. Pat. No. 3,683,882 issued on Aug. 15, 1972 to Henry R. Braxton shows a device that is adapted to be used as a fishing sling and also for shooting arrows and darts for hunting and target practice. U.S. Pat. No. 3,742,637 issued on July 3, 1973 to Peter Badovinac shows a fishing sling shot device that may be mounted to the butt of a fisherman's rod and which is provided with a spool at one end of an arrow for carrying a fishing line to which an artificial lure or fly is attached. U.S. Pat. No. 4,014,126 issued on Mar. 29, 1977 to Wiley H. Samuels and James M. Murray shows an attachment for fishing rods for slingshot casting of a fishing line which employs pivotally mounted spring arms that may be swung back into a vertical position to serve as a support for a sling that is adapted to cast a fishing line. U.S. Pat. No. 4,127,956 issued on Dec. 5, 1978 to Douglas J. Hertkorn shows a target fishing apparatus that may be attached to a conventional rod and reel assembly for casting a baited hook to a desired location. None of these references disclose the features of my invention, and none of them has the mechanical simplicity and universal use of my device. Further, my invention may be used without a fishing pole or rod and may be used with most conventional fishing reels. Any sling support having a U-shaped yoke and handle can be quickly and easily adapted for attachment to and use with my invention.

SUMMARY OF THE INVENTION

The fishing slingshot fixture of the present invention has all the advantages of similar devices known in the prior art, and in addition it provides several distinct and important advantages not provided by existing devices.

One object of the present invention is to provide a device for casting fishing lines by which a baited hook or fishing lure may be projected to greater distances and with greater accuracy and safety than is possible by conventional means.

Another object of the present invention is to provide a fishing slingshot fixture that may be used without a fishing rod or pole.

Another object of the present invention is to provide a fishing slingshot fixture that is adapted to be used with most conventional fishing reels without the necessity of modifying the reels.

Another object of the present invention is to provide a fishing slingshot fixture that can be used with the same baits and lures that are used to take fish using conventional fishing tackle.

Another object of the present invention is to provide a fishing slingshot fixture to which any conventional slingshot having a U-shaped yoke and handle may be easily attached by fixing a pair of mounting rods to the handle.

Another object of the present invention is to provide a fishing slingshot fixture having a vertically adjustable guide eye that may be easily adjusted to accommodate reels of different sizes.

Another object of the present invention is to provide a fishing slingshot fixture that produces a compact fishing apparatus when a fishing reel and slingshot are mounted on the fixture.

Another object of the present invention is to provide a fishing slingshot fixture that can be quickly and easily assembled to or disassembled from a fishing reel and quickly and easily assembled to or disassembled from a slingshot.

Another object of the present invention is to provide a fishing slingshot fixture that will aid a fisherman in obtaining long, accurate placement of his fishing line, even in confined areas.

Another object of the present invention is to provide a fishing slingshot fixture that will allow a fisherman to quickly alternate between a conventional reel mounting and the mounting of the present invention as the fisherman moves from open areas where there is adequate space for swinging a fishing rod to confined spaces where swinging a fishing rod might be difficult, impossible or dangerous.

Another object of the present invention is to provide a fishing slingshot fixture that is simple in construction, inexpensive, strong and durable, and well adapted for the purposes for which it is designed.

Other objects and advantages of the present invention will become apparent from a consideration of the following detailed description taken in connection with the accompanying drawings wherein a preferred embodiment of the invention is shown. It should be understood that the invention is not limited to the details disclosed, but includes all such variations and modifications as fall within the spirit of the invention and the scope of the appended claims.

The objectives of the present invention are accomplished by providing a fishing slingshot fixture comprising a base plate that is provided with a vertically adjustable fishing line guide eye at its front end and that is adapted to receive a fishing reel quickly and detachably coupled to its top surface and that is adapted to receive a rear mounted slingshot quickly and detachably coupled thereto.

BRIEF DESCRIPTION OF THE DRAWINGS

A preferred embodiment of the present invention is illustrated in the accompanying drawings in which.

DESCRIPTION OF THE PREFERRED EMBODIMENT

Figure 1:
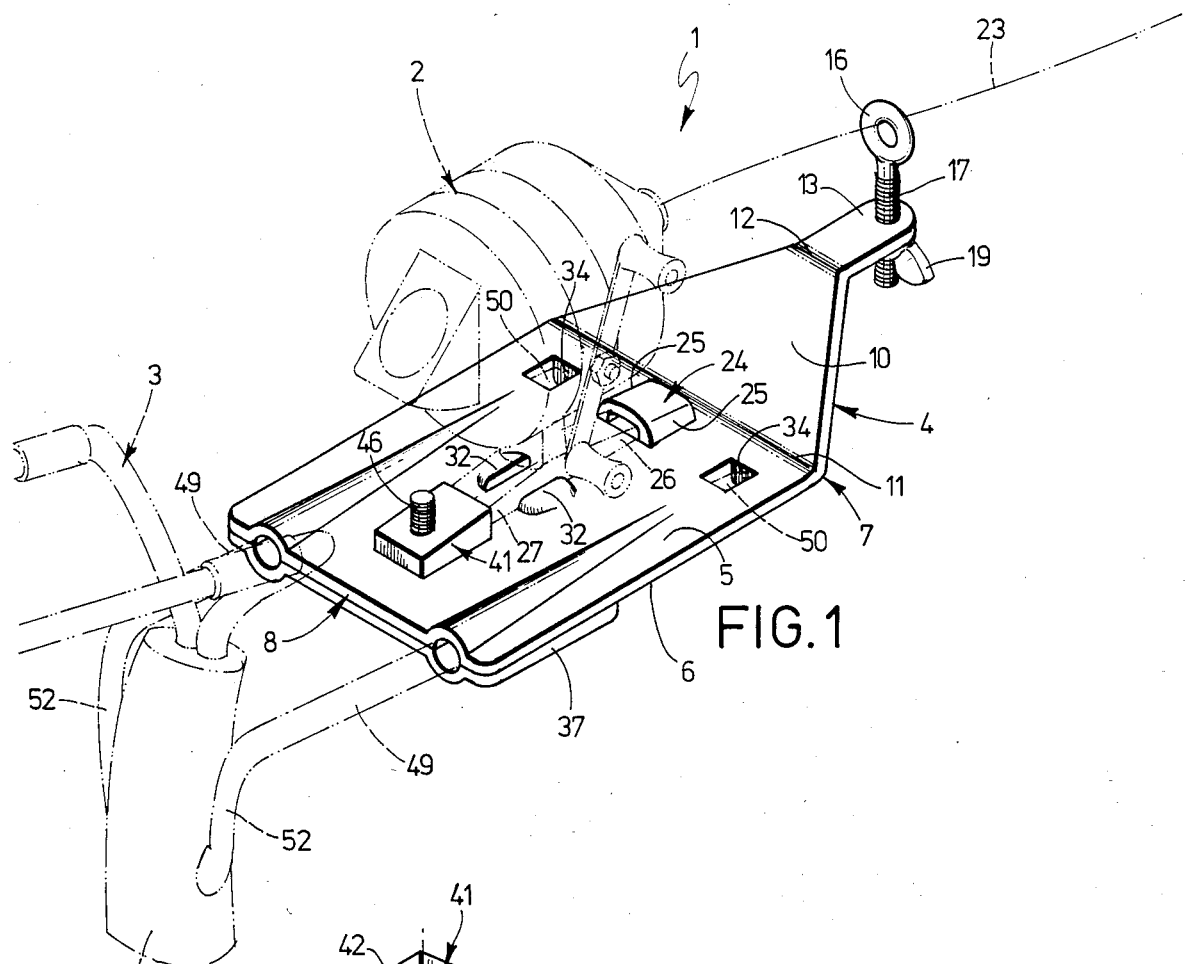
FIG. 1 is a top view of the fixture of the present invention in perspective.
Figure 2:
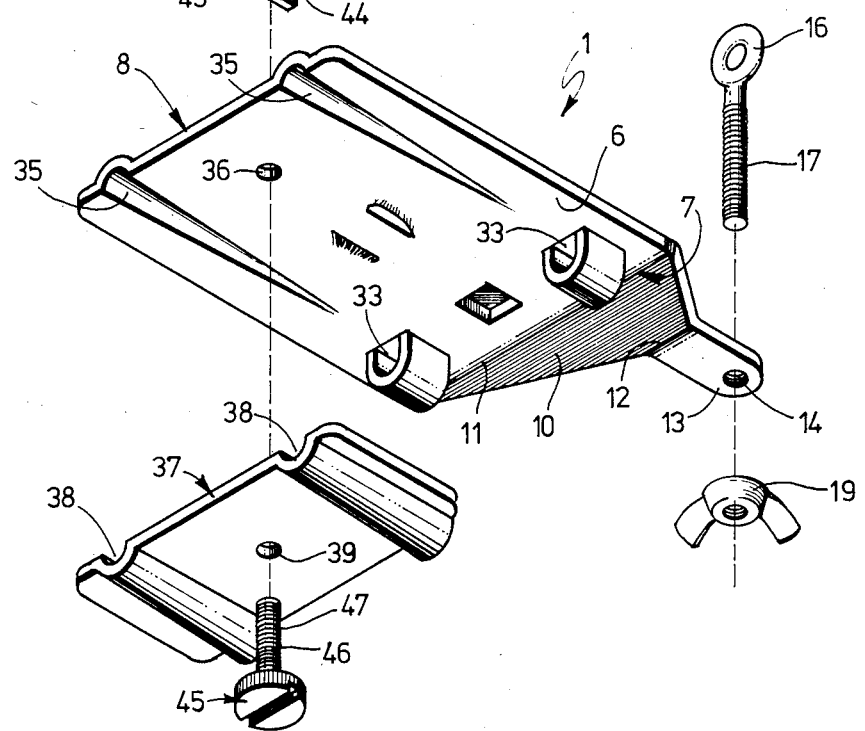
FIG. 2 is an exploded bottom view of the fixture of the present invention in perspective.

Referring now to the drawings in greater detail, FIGS. 1 and 2 illustrate the fishing slingshot fixture of the present invention, shown generally at 1.

The fixture 1 comprises a base plate 4 having a top surface 5, a bottom surface 6, a front end 7 and a back end 8, and the said plate 4 is adapted to receive a fishing reel 2 and a slingshot 3 detachably coupled thereto.

A guide arm 10 bent at two places 11, 12 and having a free end 13 extends forward and upward from the front end 7 of the base plate 4. The free end 13 of the arm 10 is approximately parallel with the plane of the base plate 4, and is provided with a threaded vertical hole 14 therethrough adapted to receive the threaded shank 17 of a vertically adjustable threaded eye-bolt 16 which is mounted vertically on the free end 13 of the arm 10 by screwing it into the threaded hole 14 and placing a locking nut 19 on the shank 17. The threaded eye-bolt 16 is adapted to serve as a guide-eye for a fishing line 23 extending forward from a reel 2.

A front reel holder 24 is provided on the top 5 and near the front 7 of the base plate 4, the said holder 24 being adapted to receive a front foot 26 of a fishing reel 2 removably inserted and wedged therein. In the illustrated embodiment the holder 24 is a scoop-like socket formed into the base plate 4. It will be readily seen that functionally equivalent retainers might be provided by means of a detachable clamp bolted to the base plate or by other suitable means within the scope of the present invention. The sides 25 of the front reel holder 24 prevent twisting of a fishing reel 2 relative to the base plate 4.

A pair of spaced-apart, downward projecting, rearward-opening, closed-end sockets 33 are formed in the base plate 4 and are adapted to receive the ends 50 of a pair of coupling rods 49 inserted therein and abutted against the backs 34 thereof. A pair of parallel semi-circular guide channels 35 are provided in the bottom 6 of the base plate 4 lengthwise thereof and are adapted to engage and clamp a pair of slingshot coupling rods 49 laid therein.

A mounting hole 36 is provided through the base plate 4 near the back end 8 thereof, which hole is adapted to receive the shaft 46 of a bolt 45 inserted therethrough.

Also provided is a bottom clamp 37 having a pair of spaced apart and parallel upward-opening semi-circular channels 38 which channels 38 are adapted to fit over a pair of slingshot coupling rods 49 and to clamp the said rods 49 the base plate 4. A mounting hole 39 is provided through the bottom clamp 37 which hole 39 is adapted to receive a shaft 46 of a bolt 45 inserted therethrough.

Also provided is a clamp nut 41 having a threaded hole 42 therethrough which threaded hole 42 is adapted to engage the threads 47 on the shank 46 of a bolt 45. Also provided on the underside 43 of the clamp nut 41 is a recess 44 adapted to fit over a back foot 27 of a fishing reel 2.

A pair of spaced-apart raised nubs 32 are provided on the top surface 5 of the base plate 4 and are adapted to serve as stops to prevent twisting of the back foot 27 of a reel 2 relative to the base plate 4.

In use, the front foot 26 of a fishing reel 2 is inserted into the scoop 24 on the top 5 of the base plate 4 and the back foot 27 of the reel 2 is placed between the raised nubs 32. A pair of coupling rods 49 attached at one end 52 to a slingshot 3 are laid into the channels 35 in the bottom 6 of the base plate 4 with the free ends 50 of the rods 49 inserted into the sockets 33 and jammed against the backs 34 of the sockets 33. The bottom clamp 37 is placed against the bottom 6 of the base plate 4 with the channels 38 engaging the rods 49. The clamp nut 41 is placed against the top 5 of the base plate 4 with the back foot 27 of the reel 2 placed within the recess 44 in the bottom 43 of the clamp nut 41. The holes 36, 39, and 42 in the base plate 4, bottom clamp 37 and clamp nut 41 are aligned with each other and a bolt 45 is inserted through the holes 36, 39, 42 from the bottom and tightly secured to the clamp nut 41, thus securely coupling the rods 49 of a slingshot 3 and the back foot 27 of a fishing reel 2 to the base plate 4. Once the reel and rods are clamped to the base plate 4 in the manner described, the pair of raised nubs 32 prevent the back foot 27 of the fishing reel 2 from twisting relative to the base plate 4, and the back foot 27 of the reel 2 prevents the clamp nut 41 from twisting relative to the base plate 4. The channels 35, 38 in the base plate 43 and bottom clamp 37 prevent twisting of the mounting rods 49 relative to the base plate 4. To use the device, a fisherman simply places a baited hook or fishing lure on the end of the fishing line and propels it with the slingshot to the desired location.

Having thus described my invention, what I now claim is:

1. A fishing slingshot fixture adapted to receive a fishing reel and a slingshot detachably coupled thereto comprising a base plate having a top surface, a bottom surface, a front end and a back end and having provided thereon a guide arm having a free end having provided thereon a guide eye adapted to guide a fishing line; said base plate having provided on the top surface thereof a front reel holder adapted to receive a front foot of a fishing reel removably inserted therein, said front reel holder being adapted to prevent twisting or lateral slippage of said reel relative to the said base plate; said base plate also having provided therein socket means and guide means adapted to receive a pair of slingshot mounting rods removably inserted therein and adapted to prevent twisting or lateral slippage of said rods relative to said base plate, and constraining means adapted to prevent twisting or lateral slippage of a foot of a fishing reel relative to said base plate; clamping means adapted to engage and clamp a pair of slingshot mounting rods and a fishing reel to said base plate; and fastening means adapted to couple the aforesaid clamping means to said base plate.

2. A fishing slingshot fixture adapted to receive a fishing reel and a slingshot detachably coupled thereto comprising a base plate having a top surface, a bottom surface, a front end and a back end and having provided thereon a guide arm that extends forward and upward from the front end thereof, said guide arm having a free end having provided thereon a vertically mounted and vertically adjustable guide eye adapted to guide a fishing line, wherein said guide arm is bent at two places and the said free end of said guide arm is approximately parallel with the plane of said base plate and said free end of said guide arm is provided therethrough with a threaded hole adapted to receive the shank of a threaded and vertically adjustable eye-bolt; said base plate having provided on the top surface thereof a front reel holder adapted to receive a front foot of a fishing reel removably inserted therein, said front reel holder being adapted to limit twisting or lateral slippage of said reel relative to said base plate; said base plate also having provided therein a pair of spaced-apart, rearward-opening sockets adapted to receive the free ends of a pair of slingshot mounting rods removably inserted therein, a pair of guide channels adapted to engage and clamp a pair of slingshot coupling rods to said base plate and adapted to prevent twisting or lateral slippage of said rods relative to said base plate, and constraining means comprising a pair of spaced-apart, raised nubs adapted to restrict twisting or lateral slippage of a foot of a fishing reel relative to said base plate; clamping means comprising a clamp adapted to be detachably coupled to said base plate and having provided therein a pair of guide channels adapted to engage and clamp a pair of slingshot mounting rods to said base plate; and fastening means comprising a clamp nut and bolt adapted to detachably couple the aforesaid clamp and a foot of a fishing reel to said base plate, wherein the said clamp nut has provided in the bottom thereof a recess adapted to fit over and restrict the movement of a foot of a fishing reel relative to said base plate and wherein said clamp nut is provided with a threaded hole therethrough adapted to fasten said clamp nut to said bolt.

* * * * *